(12) United States Patent
Raman et al.

(10) Patent No.: US 8,494,094 B2
(45) Date of Patent: Jul. 23, 2013

(54) DEMODULATION OF DATA COLLECTED PRIOR TO BIT EDGE DETECTION

(75) Inventors: Sundar Raman, Fremont, CA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 12/848,819

(22) Filed: Aug. 2, 2010

(65) Prior Publication Data

US 2012/0027133 A1 Feb. 2, 2012

(51) Int. Cl.
*H03D 1/00* (2006.01)

(52) U.S. Cl.
USPC ......................................................... 375/343

(58) Field of Classification Search
USPC ............... 375/148–150, 340, 343; 342/357.1, 342/357.12
See application file for complete search history.

(56) References Cited

U.S. PATENT DOCUMENTS

| | | | |
|---|---|---|---|
| 6,185,427 B1 | 2/2001 | Krasner et al. | |
| 6,313,786 B1 | 11/2001 | Sheynblat et al. | |
| 6,928,275 B1 | 8/2005 | Patrick et al. | |
| 7,477,189 B2 * | 1/2009 | Wang et al. | 342/357.62 |
| 7,660,373 B2 * | 2/2010 | Jia et al. | 375/343 |
| 7,778,311 B2 * | 8/2010 | Jia et al. | 375/150 |
| 2002/0031192 A1 | 3/2002 | Zou et al. | |
| 2006/0071851 A1 | 4/2006 | Graas et al. | |
| 2006/0114984 A1 | 6/2006 | Gaal et al. | |
| 2007/0008217 A1 | 1/2007 | Yang et al. | |
| 2008/0002797 A1 | 1/2008 | Raman et al. | |
| 2008/0049857 A1 | 2/2008 | Walton et al. | |
| 2009/0215419 A1 | 8/2009 | Farmer et al. | |
| 2009/0219202 A1 | 9/2009 | Pon | |
| 2009/0285268 A1 | 11/2009 | Gildea et al. | |

FOREIGN PATENT DOCUMENTS

WO 03017503 A2 2/2003

OTHER PUBLICATIONS

International Search Report and Written Opinion—PCT/US2011/046329—ISA/EPO—Nov. 7, 2011.

* cited by examiner

*Primary Examiner* — Khanh C Tran
(74) *Attorney, Agent, or Firm* — Howard Seo

(57) ABSTRACT

An apparatus and method begin creation and storage of correlation sums to be demodulated ("early-collected sums") prior to determination of a location of a bit of data in a wireless signal relative to a local clock. Such early storage allows demodulation of these early-collected sums at a later time, specifically on determination of the data's location in the wireless signal, thereby to yield early-collected data bits. Additionally, after determination of the data bit's location in the wireless signal, additional data bits are further generated in the normal manner, by demodulating the wireless signal, thereby to yield normally-collected data bits. Use of early-collected data bits in generating navigation data reduces the time to start data demodulation, and enables fewer normally-collected data bits to be used to generate navigation data, in several aspects of the invention.

19 Claims, 10 Drawing Sheets

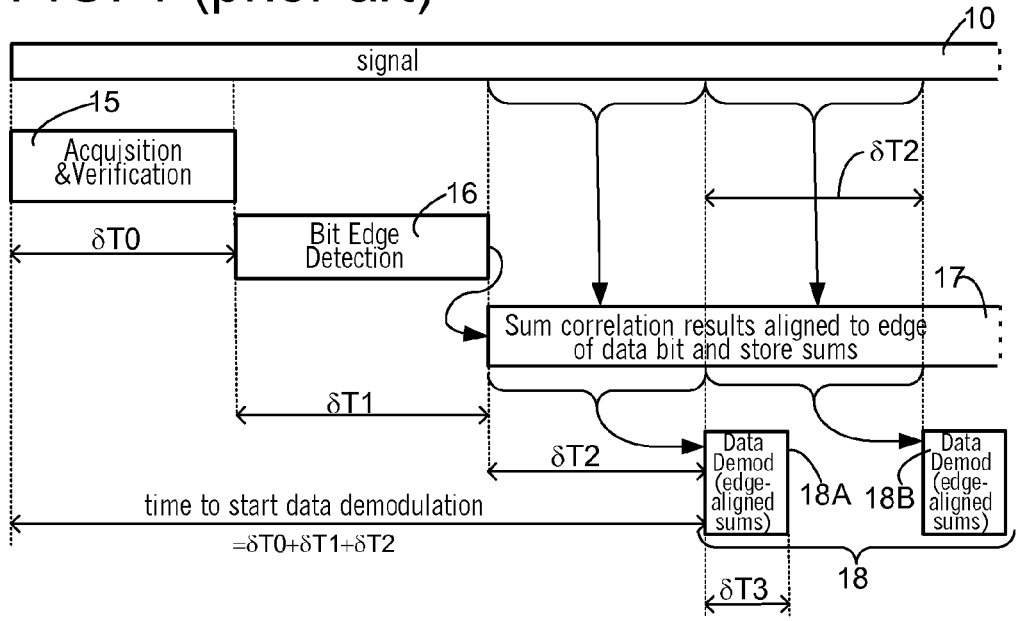
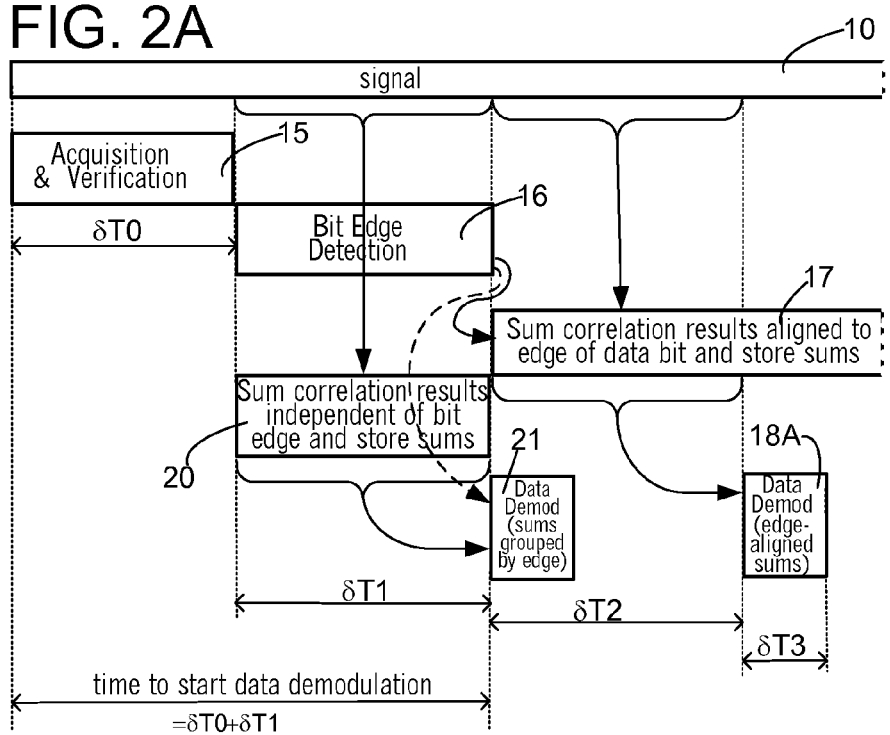

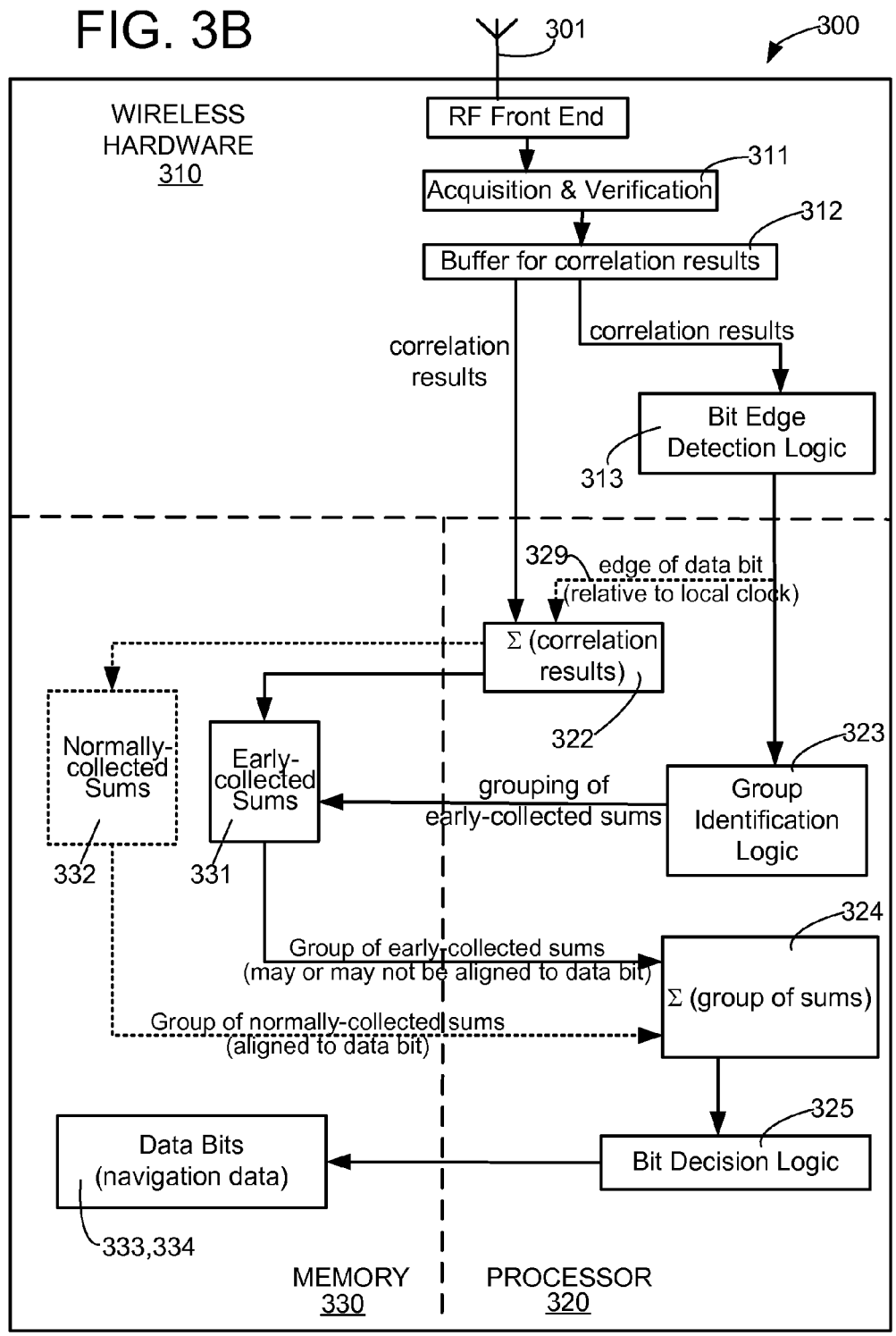

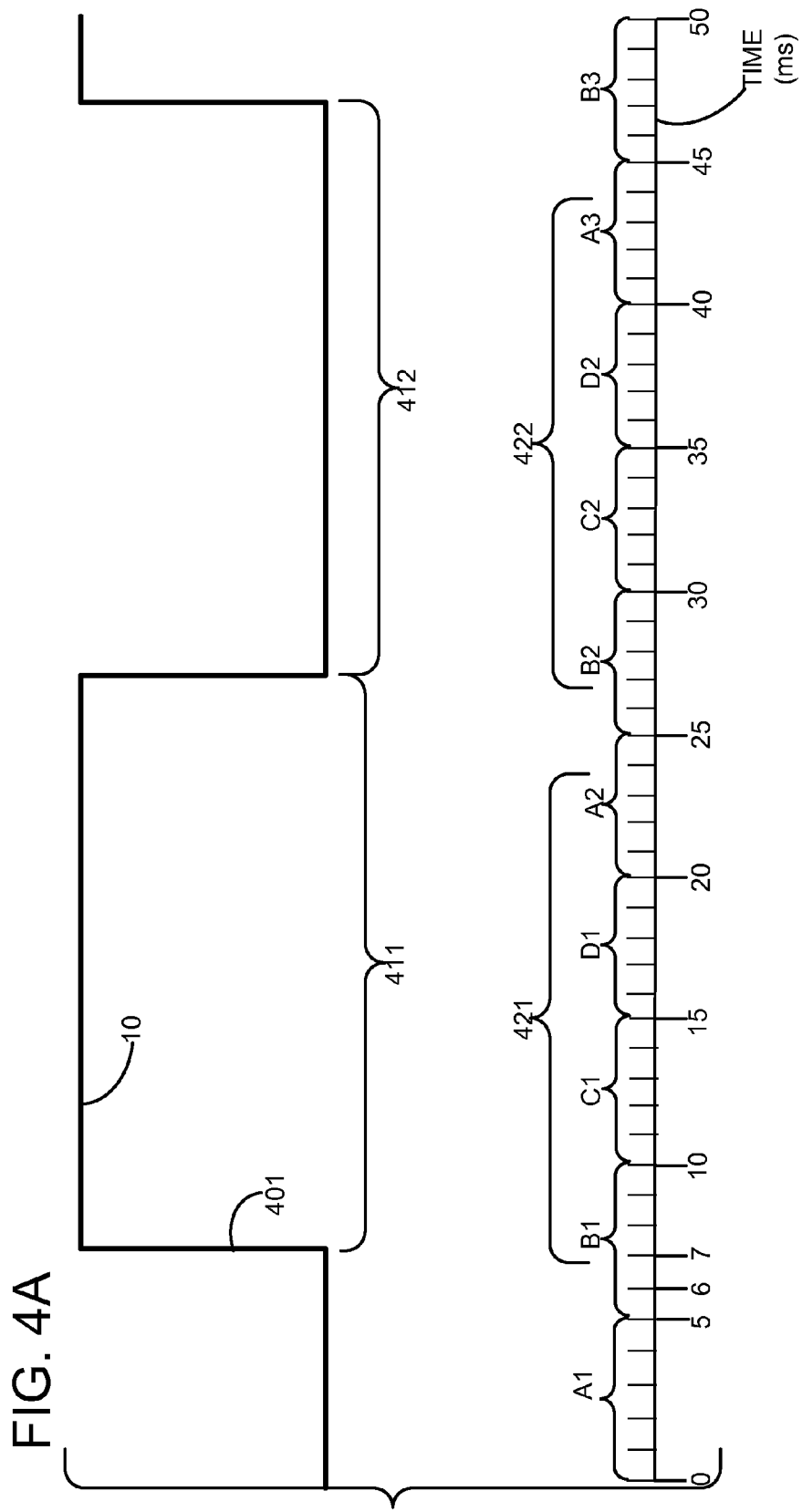

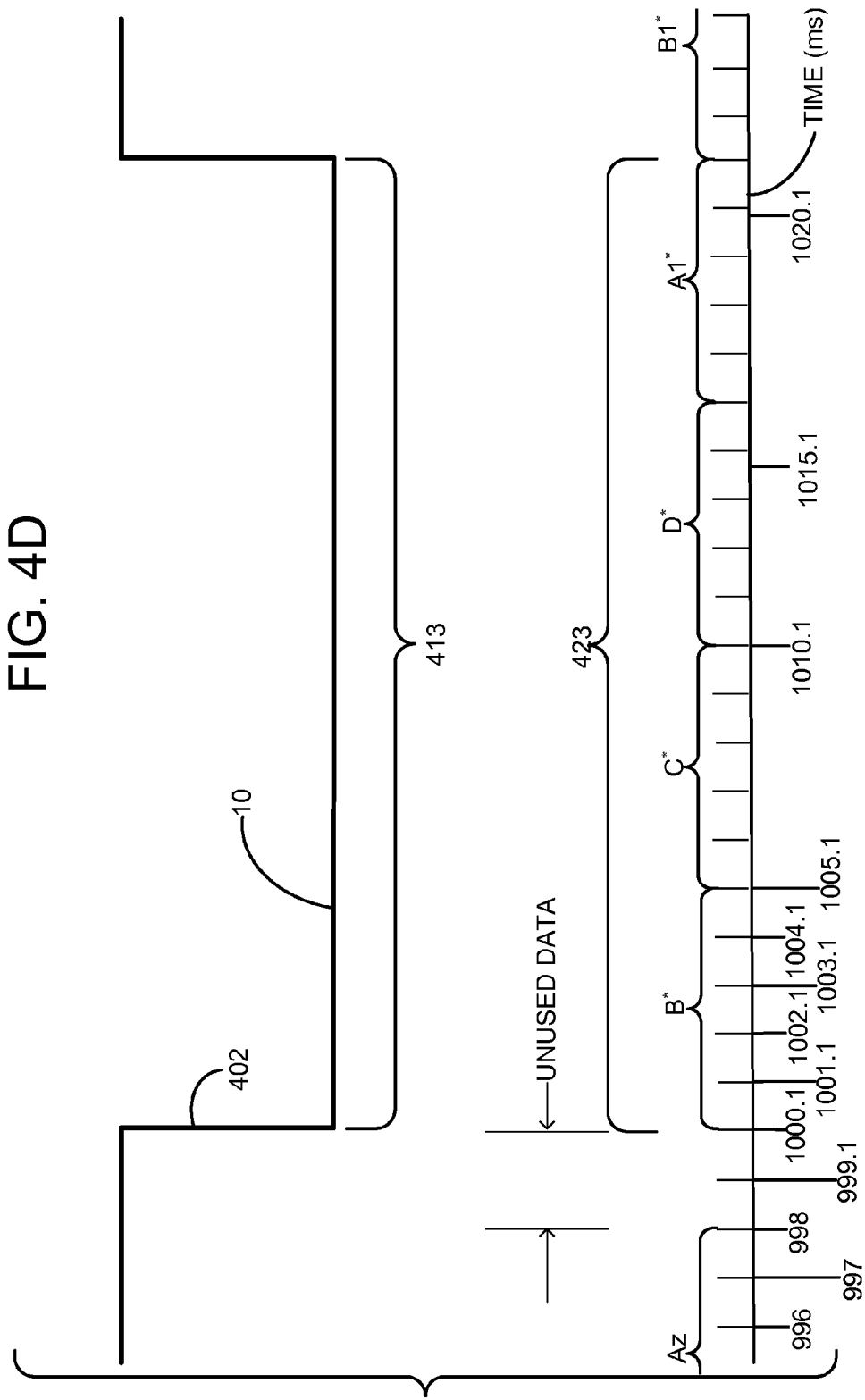

DEMODULATION OF DATA COLLECTED PRIOR TO BIT EDGE DETECTION

FIELD

This patent application relates to apparatus and methods for computing the position of a mobile device by use of wireless signals, such as satellite signals.

BACKGROUND

Position location technologies typically utilize wireless signals concurrently transmitted from known locations to determine position. In many prior art technologies, the wireless signals are concurrently transmitted from a multiplicity of satellites at a known time, and with a predefined frequency. On the ground, a satellite receiver acquires a signal from each satellite within its view of the sky. The times of arrival of the signals along with the exact location of the in-view satellites and the exact times the signals were transmitted from each satellite are used to locate the position of the satellite receiver, via a trilateration calculation well known in the art.

There are two principal functions implemented by an exemplary prior art receiver of such satellite signals: (1) computation of the pseudoranges to the various satellites, and (2) based on these pseudoranges, computation of the position of the satellite receiver, satellite timing, and ephemeris (position) data. Pseudoranges (PRs) measure the time delays (or equivalently the ranges) between the satellites and the receiver, with a bias due to (a) the local clock in the receiver and (b) satellite clock. In conventional autonomous satellite receivers, the satellite ephemeris and time of transmission data are extracted from the satellite signal, once the satellite signal is acquired and tracked. Collecting this information in a prior art receiver can take a relatively long time (e.g. 30 seconds). Alternatively, this information may be received as a part of GPS aiding information from a server and therefore could take less time.

Specifically, after a wireless signal has been received from a satellite and filtered, followed by down conversion to baseband, and correlation of the resulting signal 10 (FIG. 1) with a reference signal. The correlation typically shifts (e.g. 1023 chips of) the two signals relative to one another, followed by multiplication, followed by summing (in one example 1023 products resulting from multiplication. For example, a satellite receiver of the prior art multiplies signal 10 (in baseband) by a reference signal (not shown) that is locally generated to contain a stored replica of a predetermined code retrieved from its local memory. The results of multiplication (also called "correlation") over several milliseconds are then added up (i.e. "integrated"), to extract binary data in signal 10. The just-described predetermined code may be, for example, a Pseudorandom Noise (PN) code, such as a coarse/acquisition (C/A) code generated at a rate of 1.023 MHz that repeats every millisecond, unique to each Global Positioning System (GPS) satellite. Note that in some prior art GPS receivers, coherent integration over periods that exceed one data bit requires the receiver to have knowledge of the bit's value and location in signal 10, relative to a local clock in the receiver.

Some prior art receivers process signal 10 sequentially in three stages as follows. A first stage 15 (see FIG. 1) performs for example down-converting to baseband, signal acquisition (e.g. correlation, integration and peak processing to identify which satellites are present, to identify the code phase within each satellite's signal and to identify the frequency of each satellite's signal), and verification are performed in time period $\delta T0$ shown in FIG. 1. Such a receiver then detects the occurrence of an edge of a bit of digital data from a specific satellite carried by signal 10 (e.g. during time period $\delta T1$ shown in FIG. 1, typically 1 second), in a second stage 16 called "bit edge detection". After a bit edge is detected, the bit edge's location in signal 10 is used in a third stage 17, to correlate the specific satellite's signal with the reference signal corresponding to the specific satellite that was acquired, aligned to the edge of the data bit, and to integrate (i.e. add up) results of correlation, to generate sums ("integration sums"). Bit edge detection has other uses, e.g. the bit edge is also used in pseudorange (PR) computation.

After successful completion of bit edge detection, a fourth stage 18 called "data demodulation" begins, wherein the receiver determines the values of data bits in signal 10, based on the integration sums. By the time the fourth stage 18 begins, a predetermined number of integration sums are generated between time $\delta T0+\delta T1$ and time $\delta T0+\delta T1+\delta T2$ as shown in FIG. 1. Generation of data bits from integration sums is well known in the art of data demodulation of a GPS signal, and not described further herein. Note that in such a prior art method, the period of time required to start data demodulating is $\delta T0+\delta T1+\delta T2$. Demodulation stage 18 is performed in several substages, 18A, 18B etc. because the time $\delta T3$ required for demodulation of integration sums is less than the time $\delta T2$ required for correlation and integration in stage 17.

While performing data demodulation in first substage 18A (FIG. 1), the prior art receiver continues to perform correlation and continues to generate integration sums in stage 17. Specifically, between time $\delta T0+\delta T1+\delta T2$ and time $\delta T0+\delta T1+2\delta T2$, additional results of correlation are integrated and additional normally-collected sums are stored. Therefore, after time $\delta T0+\delta T1+2\delta T2$, the just-described data demodulation is repeated in a second substage 18B (FIG. 1) using the additional normally-collected sums, thereby to generate additional data bits from signal 10. Accordingly, correlation, integration of a number of results of correlating, and data demodulation may be repeated any number of times, to generate any number of data bits from signal 10. If each data bit is 20 ms in duration, then fifty data bits are generated (i.e. extracted) by each substage in demodulation stage 18. The data bits extracted from signal 10 are eventually used to determine navigation data. The navigation data includes all data transmitted by the satellite, for example, satellite position, satellite clock, information about other satellites (e.g. almanac), etc. Such navigation data may be used to compute the position of the receiver, timing at the transmitter, ephemeris (position) data, and satellite clock correction data.

For more information on signal acquisition, downconverting to baseband, correlating and verification see U.S. Pat. Nos. 6,313,786, 6,185,427, 6,928,275 and US Publication 2006-0114984 all of which are incorporated by reference herein in their entirety. For background information on detection of an edge of a data bit (also called "bit edge transition" or "bit edge boundary") see US Publication 20090219202 which is also incorporated by reference herein in its entirety. For background information on demodulation to generate data bits, see US Publications 20090215419, 20080049857 and 20020031192 all of which are incorporated by reference herein in their entirety.

The inventors of this current patent application believe it would be beneficial to reduce the prior art duration required to start data demodulation, to a time period that is less than $\delta T0+\delta T1+\delta T2$ (see FIG. 1). For example, the inventors believe that an early start of data demodulation allows the location of a cellular phone to be determined quickly, in case an emergency number is being dialed.

SUMMARY

In several aspects of the invention, an apparatus and method begin collection of data ("early collected data") prior to determination of an edge (or location in time) relative to a local clock, of a data bit in a wireless signal. The just-described start of data collection prior to determination of the data bit's location enables demodulation of the early-collected data as soon as a data bit's location is determined. Hence, the amount of time to be spent in waiting, before data demodulating can begin, is decreased in several aspects of the invention, relative to prior art known to the inventors.

In some aspects of the invention, initially a wireless signal is correlated with a local reference signal, and a number of results of correlating are stored in a memory (or buffer), without any knowledge of the data bit's edge (or boundary). A number of initial results of correlation are integrated and stored in memory ("computer memory"), as early-collected sums (e.g. for 1 second, 2 seconds or even 3 seconds). Subsequently, when data bit's location is determined, the early-collected sums are grouped by use of the data bit's location, to correspond to data bits in the wireless signal, and the groups are demodulated to generate data bits ("early-collected data bits"). In one illustrative embodiment, the correspondence is implemented by grouping sums based on the occurrence of the sums at least partially within the duration of a data bit (e.g. occurring wholly within or straddling the data bit). After determination of the data bit's location, data collection from the wireless signal is continued, in the normal manner based on the data bit's location, to demodulate the wireless signal in the normal manner and generate additional data bits ("normally-collected data bits").

Normally-collected data bits are used in combination with the early-collected data bits, to generate navigation data in several aspects of the invention. Use of the early-collected data bits eliminates the need to wait until a corresponding number of normally-collected data bits are generated, in order to generate navigation data.

It is to be understood that several other aspects of the invention will become readily apparent to those skilled in the art from the description herein, wherein it is shown and described various aspects by way of illustration. The drawings and detailed description are to be regarded as illustrative in nature and not as restrictive.

BRIEF DESCRIPTION OF THE DRAWINGS

FIG. 1 illustrates prior art processing of a satellite signal in multiple stages.

FIGS. 2A and 2B illustrate alternative aspects of the invention, wherein a new stage 20 is performed by summing up the results of correlating concurrently with bit edge detection to generate early-collected sums, and another new substage 21 is performed to demodulate the early-collected sums prior to demodulation of normally-collected sums in substage 18A.

FIGS. 3A-3C illustrate, in block diagrams, alternative aspects of implementing new stages of the type illustrated in FIGS. 2A and 2B in a wireless receiver 300 that includes wireless hardware 310, a processor 320 and a memory 330 coupled to the processor 320.

FIG. 4A illustrates in some aspects of the invention, use of an edge (or boundary) 401 of a bit of data in signal 10 to group early-collected sums B1, C1, D1 and A2 into group 421 corresponding to data bit 411 and to group early-collected sums B2, C3, D2 and A3 into group 422 corresponding to data bit 412.

FIG. 4D illustrates in some aspects of the invention, switching from collection and demodulation of early-collected sums up to time 998, to normal collection and demodulation starting at time 1000.1, wherein two milliseconds of data are discarded (unused) due to a phase difference between an integration boundary (based on the local clock) and the bit edge (of a data bit that has been newly detected).

DETAILED DESCRIPTION

Figure 2B:
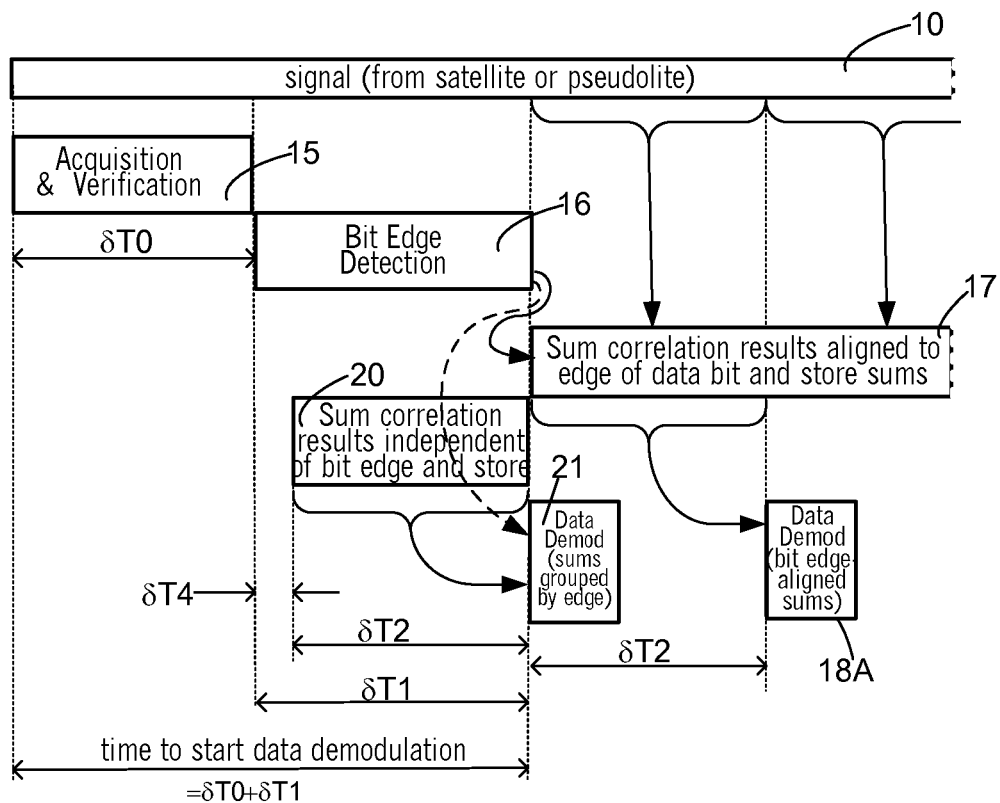

In several aspects of the invention, correlation results (stored in buffer 312 in FIG. 3A) are generated from a signal 10 (FIG. 2A) received wirelessly by a wireless receiver 300 (FIG. 3A) that has no knowledge of the location in time of bits of data in signal 10 relative to a local clock signal. Note that signal 10 (FIG. 2A) is transmitted by a satellite or a pseudo-lite, depending on the aspect of the invention. In some aspects, signal 10 is a down-converted baseband form of a wireless signal (not shown) that is received at an antenna 301 (FIG. 3A) of wireless receiver 300.

Referring to FIG. 2A, wireless receiver 300 performs a first stage 15 wherein signal acquisition, down-converting to baseband, correlating and verification are performed in the normal manner (e.g. in time period $\delta T0$ shown in FIG. 2A). For example, correlation results (e.g. of 1 ms duration) are created by a circuit 311 in hardware 310 (FIG. 3A) in wireless receiver 300 in the normal manner, by correlating wireless signal 10 with a locally generated reference signal (not shown). The results of correlation are initially stored in buffer 312 (FIG. 3A) in hardware 310. Accordingly, buffer 312 (FIG. 3A) in hardware 310 is comprised in a means for storing a plurality of results of correlating in some aspects of the invention.

Figure 3A:
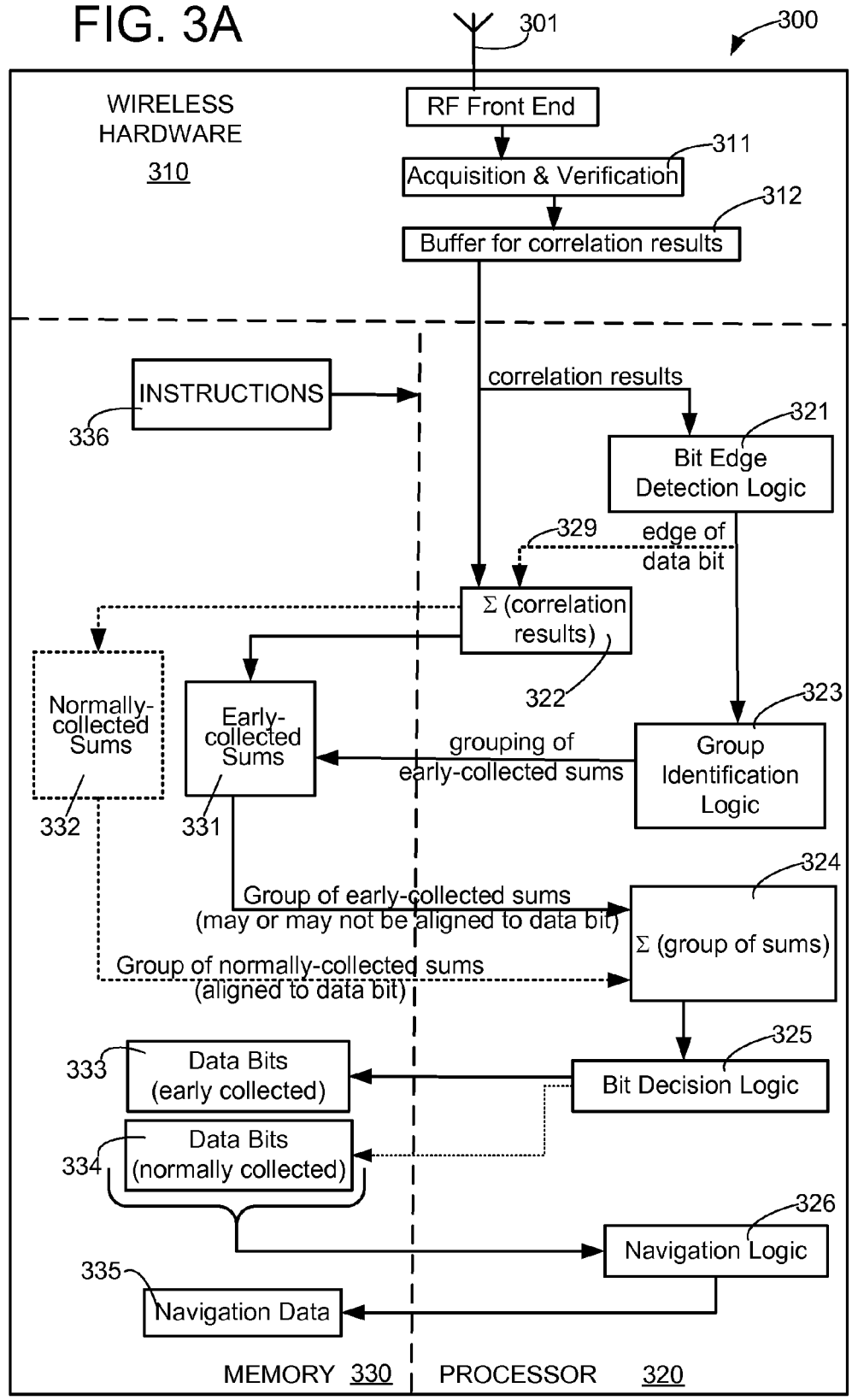

After verification is completed, processor 320 is programmed in several aspects of the invention to retrieve correlation results (e.g. of 1 ms duration) from buffer 312 (FIG. 3A) and use the retrieved results in at least two different ways, starting at time $\delta T0$ (FIG. 2A), as follows. Firstly, processor 320 performs a second stage 16 starting at time $\delta T0$, wherein the edge (or boundary) of a data bit in the wireless signal is detected relative to a local clock signal, requiring a time period $\delta T1$ as shown in FIG. 2A. For example, processor 320 is programmed in several aspects of the invention, to operate as bit edge detection logic 321 (FIG. 3A). Secondly, processor 320 additionally performs a new stage 20 (FIG. 2A) to integrate (i.e. sum up or add up) the correlation results (e.g. of 1 ms duration) in buffer 312 while stage 16 is being performed, i.e. simultaneously. Hence, processor 320 is programmed in several aspects of the invention, to operate as a summer 322 (FIG. 3A) as well as perform bit edge detection in logic 321, e.g. logic 321 and summer 322 shown in FIG. 3A are implemented as two threads that run concurrently relative to one another during the time period $\delta T1$ as shown in FIG. 2A.

Outputs generated by summer 322 during the time period $\delta T1$ are stored in memory 330 (FIG. 3A), as early-collected sums 331. Early-collected sums 331 are collected by summer 322 over a predetermined duration of a data bit in the wireless signal, or any fraction of the predetermined duration (which can be any one of 5 ms, 4 ms, 2 ms, 1 ms or even 20 ms), depending on the aspect of the invention. Certain aspects of the invention that use a small duration, such as 1 ms require greater storage and provide better resolution relative to other aspects of the invention that use a larger duration such as 20 ms. Note that summer 322 in hardware 310 is comprised in a means for integrating the results of correlating, in some aspects of the invention. Moreover, in certain aspects of the invention, locations in memory 330 which hold the early collected sums 331 are comprised in a means for storing the sums produced by the just-described means for integrating.

Early-collected sums 331 (e.g. each sum of 5 ms duration) are later used by processor 320 in a new demodulation substage 21 (FIG. 2A) that starts after time $\delta T0 + \delta T1$. Specifically, demodulation substage 21 starts data demodulating only after bit edge detection logic 321 (FIG. 3A) determines the edge of data bits. Accordingly, logic 321 in hardware 310 is comprised in a means for using at least the results of correlating, to determine the location of the edge of the data bit relative to the local clock, in some aspects of the invention. As soon as the location of a data bit's edge is known, the bit edge's location (relative to the local clock) is used by a group identification logic 323 (FIG. 3A) to organize the early-collected sums 331 into groups, such that each group ("early-collected group") corresponds to a common bit of data (e.g. 20 ms) in signal 10. Hence, processor 320 is additionally programmed in several aspects of the invention, to operate as a group identification logic 323 (FIG. 3A).

In demodulation substage 21 (FIG. 2A), a group of early-collected sums 331 are summed together by a summer 324 (FIG. 3A) for the duration of a data bit (e.g. 20 ms), and the summation result is supplied to bit decision logic 325 that determines a binary value (e.g. 0 or 1) for a data bit corresponding to the early-collected group, thereby to generate data bits (early-collected data bits"). Hence, processor 320 is further programmed in several aspects of the invention, to operate as summer 324 and as bit decision logic 325 (FIG. 3A). Accordingly, in several aspects of the invention, group identification logic 323, summer 324 and bit decision logic 325 are together comprised in a means for demodulating the early-collected sums 331, based on a location of an edge of the data bit, so as to generate data bits.

Each data bit (e.g. of 20 ms duration) generated from an early-collected group is stored in memory 330, as one of the early-collected data bits 333. Hence, in certain aspects of the invention, locations in memory 330 which hold data bits 333 are comprised in a means for storing the data bit obtained from the above-described means for demodulating. In some aspects of the invention, four sums 331 of 5 ms duration each are summed up by summer 324 (FIG. 3A). In other aspects of the invention, the predetermined duration for summer 322 (FIG. 3A) is 1 ms, and in these aspects the summer 324 sums twenty sums 331 of 1 ms duration each.

Referring to FIG. 2A, starting at time $\delta T0 + \delta T1$, wireless receiver 300 additionally uses the location of a bit edge from logic 323 (FIG. 3A) in third stage 17 (FIG. 2A). Specifically, in stage 17, wireless receiver 300 begins integrating (i.e. adding up) results of correlation between signal 10 and a locally-generated reference signal differently, now based on alignment of correlation results to the data bit's edge, and stores the results in memory 330 as normally-collected sums 332. This just-described integration operation of third stage 17 is performed by wireless receiver 300 simultaneously with operation of the above-described demodulation substage 21, during at least a portion of the time $\delta T2$ as illustrated in FIG. 2A. After a predetermined number of normally-collected sums 332 are created and stored (e.g. fifty sums) during the time period $\delta T2$ as shown in FIG. 2A, a substage 18A to implement normal data demodulation begins operation as discussed next, using summer 324 and bit decision logic 325 (FIG. 3A).

Specifically, in substage 18A (FIG. 2A), the wireless receiver 300 (FIG. 3A) generates data bits (i.e. normally-collected data bits) based on the normally-collected sums 332 retrieved from memory 330 (FIG. 3A). After completion of data demodulation in substage 18A (FIG. 2A), memory 330 (FIG. 3A) holds not only normally-collected data bits 334 resulting from demodulation of the signal 10 received during the time period $\delta T2$ but also early-collected data bits 333 from demodulation of the signal 10 received during the time period $\delta T1$. Eventually, the early-collected data bits 333 and the normally-collected data bits 334 in memory 330 are used together by a navigation logic 326 in wireless receiver 300 in several aspects of the invention, to generate navigation data 335, which is used to determine, e.g. a position of wireless receiver 300 on earth, timing at the transmitter, and ephemeris (position) data. Hence, processor 320 is additionally programmed in several aspects of the invention, to operate as navigation logic 326 (FIG. 3A).

In certain aspects of the invention illustrated in FIG. 2A, duration $\delta T1$ is same as duration $\delta T2$. In one such example, durations $\delta T1$ and $\delta T2$ are both one second each. In this example, if a data bit is twenty milliseconds in duration, then on completion of substage 18A, i.e. at time $\delta T0 + \delta T1 + \delta T2 + \delta T3$ the process illustrated in FIG. 2A generates one hundred bits of data. The one hundred bits of data include fifty early-collected bits 333 (FIG. 3A) that were demodulated from the signal 10 in period $\delta T1$, and fifty normally-collected bits 334 that were demodulated from the signal 10 in period $\delta T2$.

Generation of early-collected data bits 333 as described above eliminates the prior art need to use a corresponding number of normally-collected data bits 334. For example, if two hundred data bits in total are needed to generate navigation data 335, use of fifty early-collected bits 333 in accordance with the invention requires only three data demodulation substages (each generating fifty normally-collected data bits 334). Elimination of a demodulation substage as just described reduces the time to start data demodulation by duration $\delta T2$, relative to prior art (compare FIG. 2A with FIG. 1).

Accordingly, wireless receiver 300 (FIG. 3A) can generate navigation data 335 in most situations, using normally-collected data bits 334 that are fewer in number in certain aspects of the invention, as compared to the prior art. Specifically, in those situations where the signal to noise ratio in the early-collected data bits 333 is sufficiently large, location of wireless receiver 300 is determined more quickly than in the prior art, due to the use of such early-collected data bits. In situations where the early-collected data bits 333 are too noisy (e.g. based on the number of errors found therein exceeding a preset threshold), wireless receiver 300 defaults to generating navigation data solely based on normally-collected data bits 334, i.e. in the normal manner (wherein an extra demodulation substage is required).

In certain aspects of the invention, a data demodulation substage 21 (FIG. 2A) operates on a predetermined number of integration sums (e.g. two hundred early-collected or normally-collected sums of 5 ms duration) to generate a corresponding predetermined number of data bits (e.g. fifty early-collected or normally-collected data bits). If determination of a bit edge's location takes duration $\delta T1$ that is longer than duration $\delta T2$ in which the predetermined number of data bits occur in signal, stage 20 that sums up (i.e. integrates) correlation results (FIG. 2A) may be of shorter duration than bit edge detection stage 16 as illustrated in FIG. 2B. Specifically, it is to be understood that the invention is not limited to stages 16 and 20 both taking an identical duration of time, namely δT1 as shown in FIG. 2A. In a first example shown in FIG. 2A, bit edge detection stage 16 does overlap in time with integration stage 20 during the duration δT1 such that the signal portion during time δT1 which is used in bit edge detection is also used in the generating correlation results whose integrated sums are used in demodulation in substage 21. However, in a second example shown in FIG. 2B, correlation results that are demodulated in substage 21 are of data bits that occur later in the wireless signal by duration 6T4 than an earlier data bit whose edge (or boundary) is detected by stage 16.

For example, in FIG. 2B, the time to start data demodulation is δT0+δT1 which is same as the corresponding time in FIG. 2A, although in certain aspects illustrated in FIG. 2B only data bits that occur in signal 10 during duration 6T2 immediately preceding the start of data demodulation are demodulated and used as early-collected data bits 333. In certain aspects of the invention wherein δT4>δT2 (see FIG. 2B), data demodulation is performed multiple times, to obtain additional early collected data bits, from correlation results collected during δT4.

Moreover, in some aspects of the invention, bit edge detection logic 321 as illustrated in FIG. 3A is implemented by processor 320 programmed with instructions 336 in memory 330, although logic 321 can alternatively be implemented in hardware. For example, in many aspects of the invention as illustrated in FIG. 3B, bit edge detection logic 313 is implemented as circuitry included in wireless hardware 310. Therefore, in some aspects of the invention, wireless hardware 310 (which includes logic 313) supplies to processor 320, the edge of the data bit in signal 10, relative to the local clock of processor 320. Accordingly, it should be readily apparent to the skilled artisan that any one or more of logic 323, summer 324 and logic 325 described above can be implemented either (A) by circuitry in hardware 310 or (B) by a processor 320 programmed with appropriate software instructions 336 or (C) any combination thereof. Depending on the aspect of the invention, instructions 336 can be stored in any non-transitory storage medium that is machine (or computer) readable as described below.

Figure 3C:
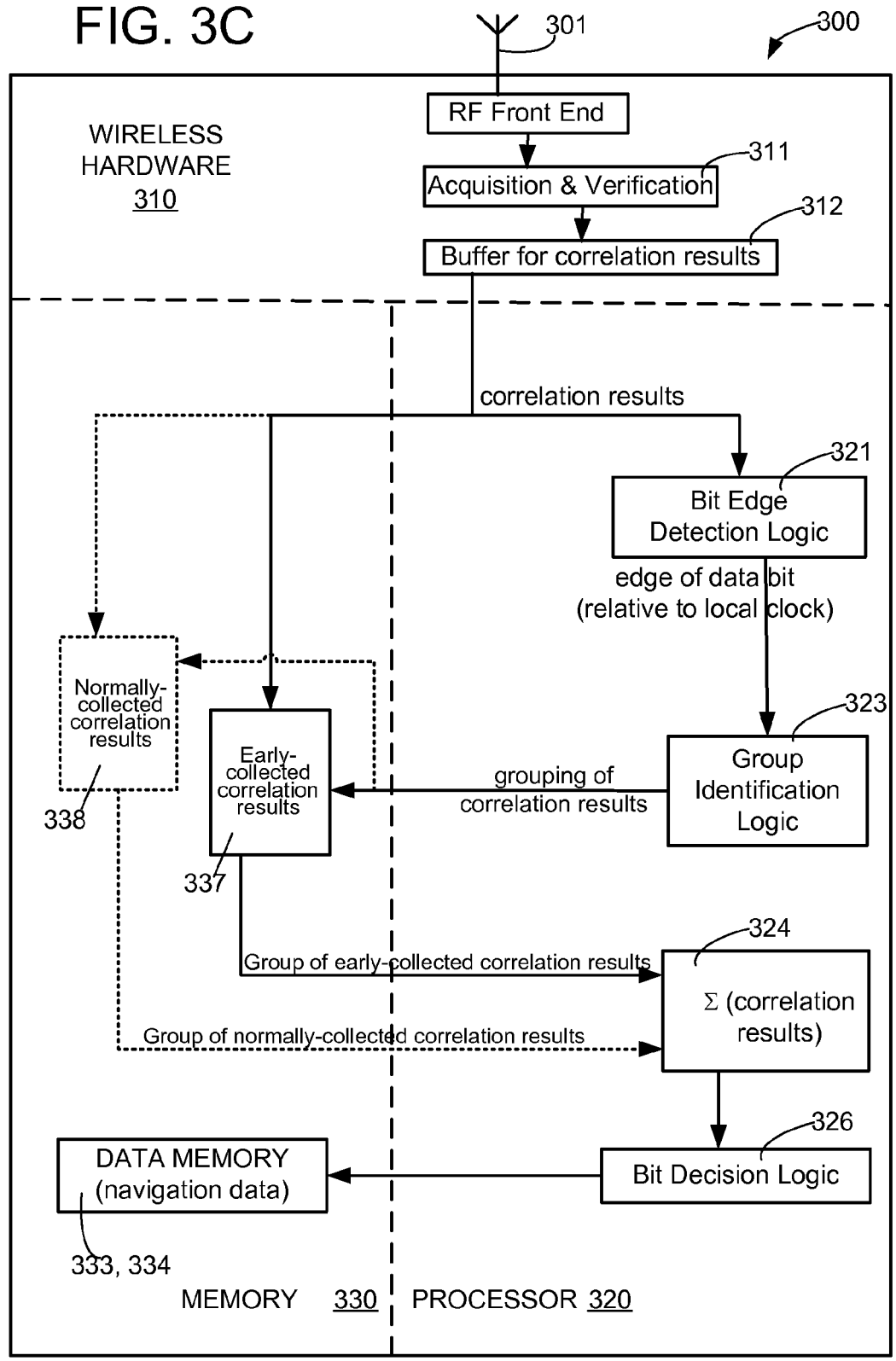

Furthermore, although in certain aspects of the invention, a summer 322 (FIG. 3A) is used to sum correlation results (e.g. over 5 ms) prior to bit edge detection to generate early-collected sums 331, in several aspects of the invention there is no such summation and instead the correlation results are directly collected. For example, as illustrated by some aspects of the invention shown in FIG. 3C, correlation results prior to summation (e.g. over 5 ms) are directly stored in memory 330 as early-collected correlation results 337. The early-collected correlation results 337 are therefore grouped by group identification logic 323 in FIG. 3C. Grouping of early-collected correlation results 337 as illustrated in FIG. 3C reduces loss due to straddling of bit transition in early-collected data bits 333 based on improved precision in the correlation results used to determine a data bit, relative to grouping of early-collected sums 331 as illustrated in FIG. 3A. However, the improved precision requires that the number of bytes used in memory 330 to hold early-collected correlation results 337 (FIG. 3C) be several times larger (e.g. over 5 times larger) than the corresponding number of bytes used to hold early-collected sums 331 of FIG. 3A, e.g. five times larger if five correlation results are added up by summer 322 of FIG. 3A.

Figure 4B:
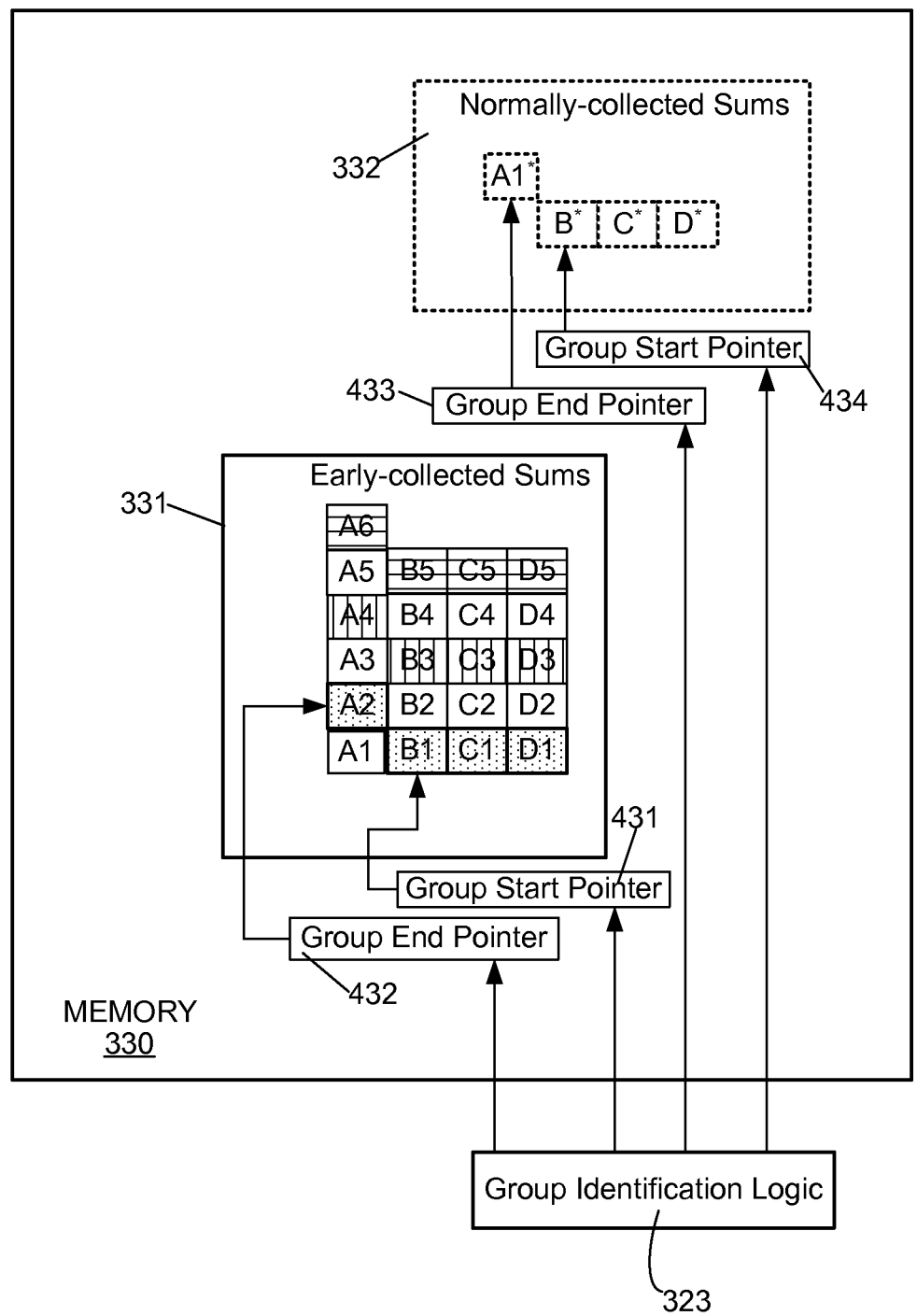
FIG. 4B illustrates early-collected sums in the memory 330 of FIG. 3A, grouped by use of bit edge to correspond to data bits in accordance with some aspects of the invention.

FIG. 4A illustrates an example of signal 10 from which wireless receiver 300 demodulates data bits starting with retrieval of correlation results in act 440, as follows. Specifically, in this example, signal 10 happens to be at a low level at time T=0 milliseconds in the local clock of wireless receiver 300 when bit edge detection begins to use the correlation results (see act 441 in FIG. 4C, performed in logic 321 of FIG. 3A). Summer 322 (FIG. 3A) adds up correlation results for a predetermined duration (see act 442 in FIG. 4C) which is selected in this example, to be five milliseconds, e.g. starting from time T=0 milliseconds up to time T=5 milliseconds. Thus, summer 322 generates the first early-collected sum A1 at time T=5 milliseconds. Note that the correlation results summed up into early-collected sum A1 in this example are not aligned to a rising edge 401 of data bit 411 in signal 10, which occurs at time T=7.1 milliseconds. The early-collected sum A1 is now stored in memory 330 (see FIG. 4B), at time T=5 milliseconds.

In this example, the correlation results for the next period of the predetermined duration, i.e. for the next five milliseconds, from time T=5 milliseconds to time T=10 milliseconds are summed up by summer 322 to generate the next early-collected sum B1, also stored in memory 330. In the manner described above, summer 322 is repeatedly operated until bit edge detection is completed (see act 443 in FIG. 4C), and hence several early-collected sums are generated, one sum every five milliseconds, e.g. A1, B1, C1, D1, A2, B2, C2, D2, A3, B3 and stored in memory 330 (see FIG. 4B).

Eventually, when the edge of data bit 411 is determined by logic 321 (in the normal manner) relative to the local clock, the bit edge's location is then used by group identification logic 323 (FIG. 3A) to form groups of early-collected sums 331 most (or all depending on the embodiment) of which correspond to a common data bit (to be decoded). Specifically, in the example illustrated in FIG. 4A, group identification logic 323 computes a number, identifying how many early-collected sums are to be discarded (starting at time T=0 milliseconds), and uses the undiscarded sums to form groups (as per act 444 in FIG. 4C) that correspond to data bits in signal 10, as discussed in the next paragraph. Alternative aspects of the invention use only those sums that lie completely within a duration between (i.e. do not straddle) the transitions of a data bit.

In the example illustrated in FIG. 4A, the earliest among the early-collected sums 331 which straddles the bit edge in signal 10 is determined by group identification logic 323 to be the sum B1. Specifically, group identification logic 323 uses the occurrence of rising edge in signal 10 at time T=7.1 milliseconds within the time period from T=5 milliseconds to T=10 milliseconds, to set a pointer 431 ("group start pointer") to the memory address of early-collected sum B1. Note that in setting pointer 431 (FIG. 4A), the first early-collected sum A1 (which is a sum of correlation results during this time period) is discarded (there is no edge during the time period from T=0 milliseconds to T=5 milliseconds).

In certain aspects of the invention used with GPS, group identification logic 323 uses the following equation to compute the number of early-collected sums 331 (FIG. 3A) to discard and group the remaining sums into groups that correspond to a data bit's duration (e.g. 20 milliseconds for GPS).

# of sums to discard=round((bit edge−time at start of data collection)/5)

If (bit edge−time at start of data collection)<0, then add 20 ms to the difference.

In some aspects of the invention, as illustrated in FIG. 4B, group identification logic 323 sets an additional pointer 432 ("group end pointer"), based on the period of the data bit in signal 10, which in this example is 20 milliseconds. Specifically, as early-collected sum B1 (FIG. 4A) already includes 5 milliseconds of correlation results, the remaining 15 milliseconds of correlation results are included in a group 421 (corresponding to data bit 411 in FIG. 4A) by group identification logic 323 setting pointer 432 (FIG. 4A) to the memory address of early-collected sum A2. In this manner group identification logic 323 repeatedly forms several groups, such as group 422 (FIG. 4A) corresponding to data bit 412 in signal 10.

Each of the early-collected groups 421, 422 is demodulated (as per act 445 in FIG. 4C) by bit decision logic 325, in the normal manner. Use of correlation results in group 421 starting at time T=5 milliseconds (prior to the rising edge at T=7.1 milliseconds) in this example can introduce error in the value of data bits 333. The amount of error introduced depends on several factors, such as the strength of the wireless signal 10, the number of correlation results being summed up into each early-collected sum, and the number of early-collected sums included in each group.

For example, the higher the resolution (e.g. 1 ms resolution by storing correlation results 337 and summing them directly in summer 324 instead of generating and storing correlation sums 331), the lower the loss due to straddling of a bit transition. Moreover, the stronger the wireless signal 10, and the fewer the number of correlation results being summed up, the lower the error in the value of data bits 333. Hence, a tradeoff between the amount of memory needed to hold greater number of early-collected sums v/s improvement in the accuracy of early-collected data bits 333 (FIG. 3A) will be readily apparent to the skilled artisan in view of this detailed description.

Figure 4C:
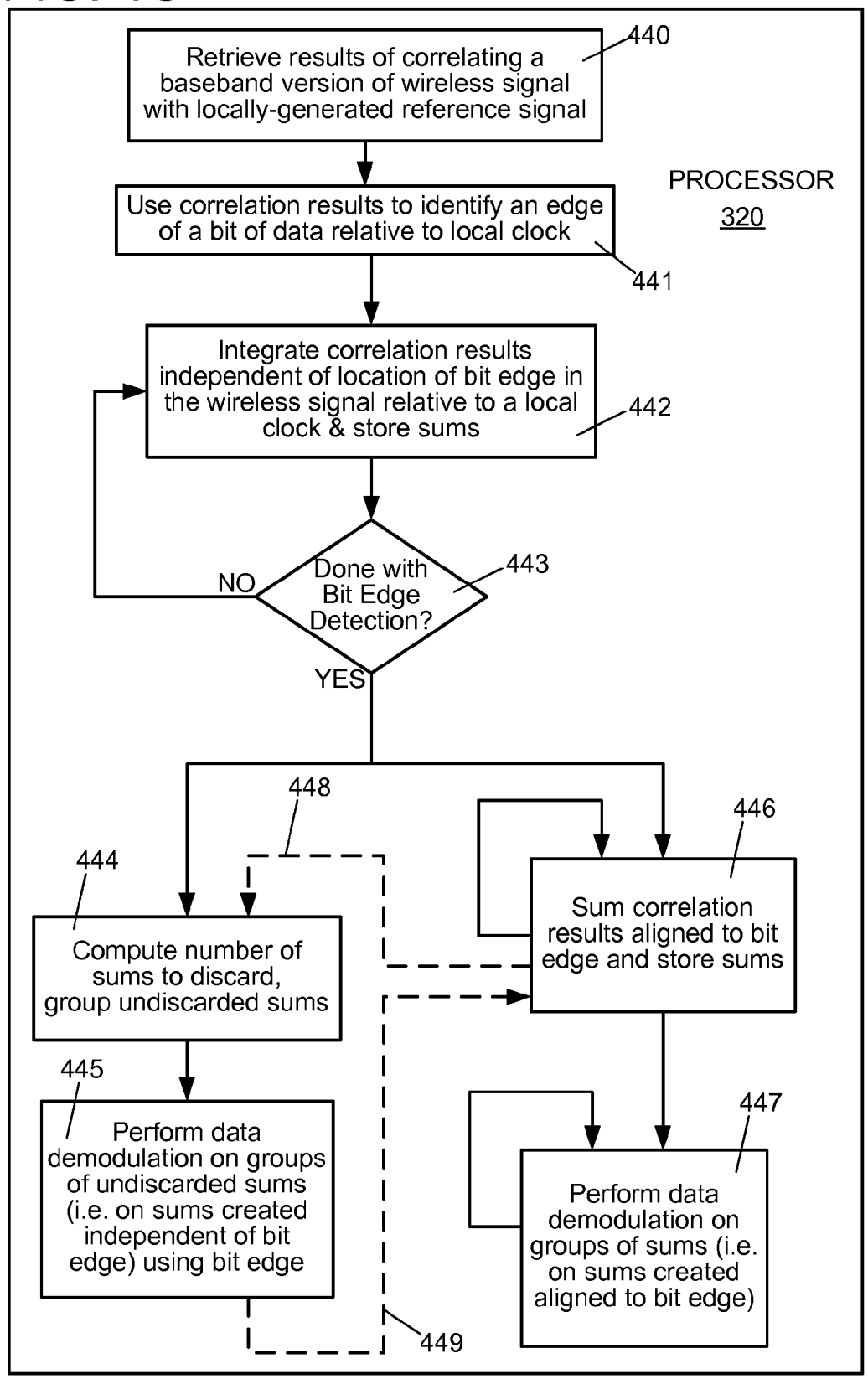
FIG. 4C illustrates, in a flow chart, a method performed in some aspects of the invention.

Furthermore, as noted above, when early-collected data bits 333 are found by navigation logic 326 (FIG. 3A) to have errors that cannot be corrected, wireless receiver 300 reverts to operating in the normal manner, by performing acts 446 and 447 illustrated in FIG. 4C, to generate navigation data solely based on normally-collected data bits 334. In act 446 (FIG. 4C), the edge of data bit 411 as determined by logic 321 is used to sum correlation results starting at the next bit edge, in some aspects of the invention.

In one example illustrated in FIG. 4D, the bit edge is determined by logic 321, at time T=995 milliseconds, i.e. that a rising edge occurs in signal 10 at the time T=7.1 milliseconds. Hence, logic 321 in some aspects of the invention determines that the next edge in signal 10 will be a falling edge occurring at time T=1000.1 milliseconds. In such aspects of the invention, logic 321 therefore notifies summer 322 to start its next correlation sum at time T=1000.1 milliseconds, on a line 329 (see FIG. 3A).

On completion of the last early-collected sum Az at time 998 (at which an integration boundary occurs), summer 322 waits until time T=1000.1 milliseconds in response to the signal on line 329, and then repeatedly adds up correlation results starting at T=1000.1 milliseconds, in the normal manner. Therefore, in some aspects of the invention, line 329 and summer 322 are together comprised in a means for using additional correlation results aligned to the location of the data bit.

Specifically, within the time period from T=1000.1 milliseconds to T=1005.1 milliseconds, summer 322 is operated by a signal on line 329 to generate the sum B* at time T=1005.1 milliseconds, which is then stored in memory 330 as one of normally-collected sums 332. Thereafter, summer 322 generates the next normally-collected sum C* at time T=1010.1 milliseconds, which is stored in memory 330 as another of the normally-collected sums 332, and so on.

In some aspects of the invention, the local clock is shifted between the time 998 and 1001.1 (see FIG. 4D), so that a chip therein is aligned to the bit edge in signal 10. In such aspects, all values shown in FIG. 4D on the x-axis identifying the time, subsequent to edge 402 in signal 10, are all integers (e.g. collection of sum B* starts at 1000 and ends at 1005).

Moreover, bit edge detection logic 321 in some aspects of the invention uses the data bit's edge to set a pair of pointers, e.g. group start pointer 433 and group end pointer 434, to the respective memory addresses of normally-collected sums B* and A1* (see FIG. 4B) of group 423 (FIG. 4C). Summer 324 (FIG. 3A) is operated to sum group 423 (see FIG. 4C) i.e. add up the normally-collected sums B*, C*, D* and A1* (each of which is aligned to the data bit's edge). The result from summer 324 (FIG. 3A) is supplied to bit decision logic 325 which determines a value of data bit 413 (FIG. 4D), and this value is stored in memory 330 (FIG. 3A) as normally-collected bit 334.

Note that when summer 322 switches from collecting early-collected sums 331 to collecting normally-collected sums 332, one or more correlation results may not be used. For example, as shown in FIG. 4D, correlation results within the time period from T=998 milliseconds to T=1000.1 milliseconds are not used due to the phase difference between the local clock and the data bits in signal 10.

Figure 5:
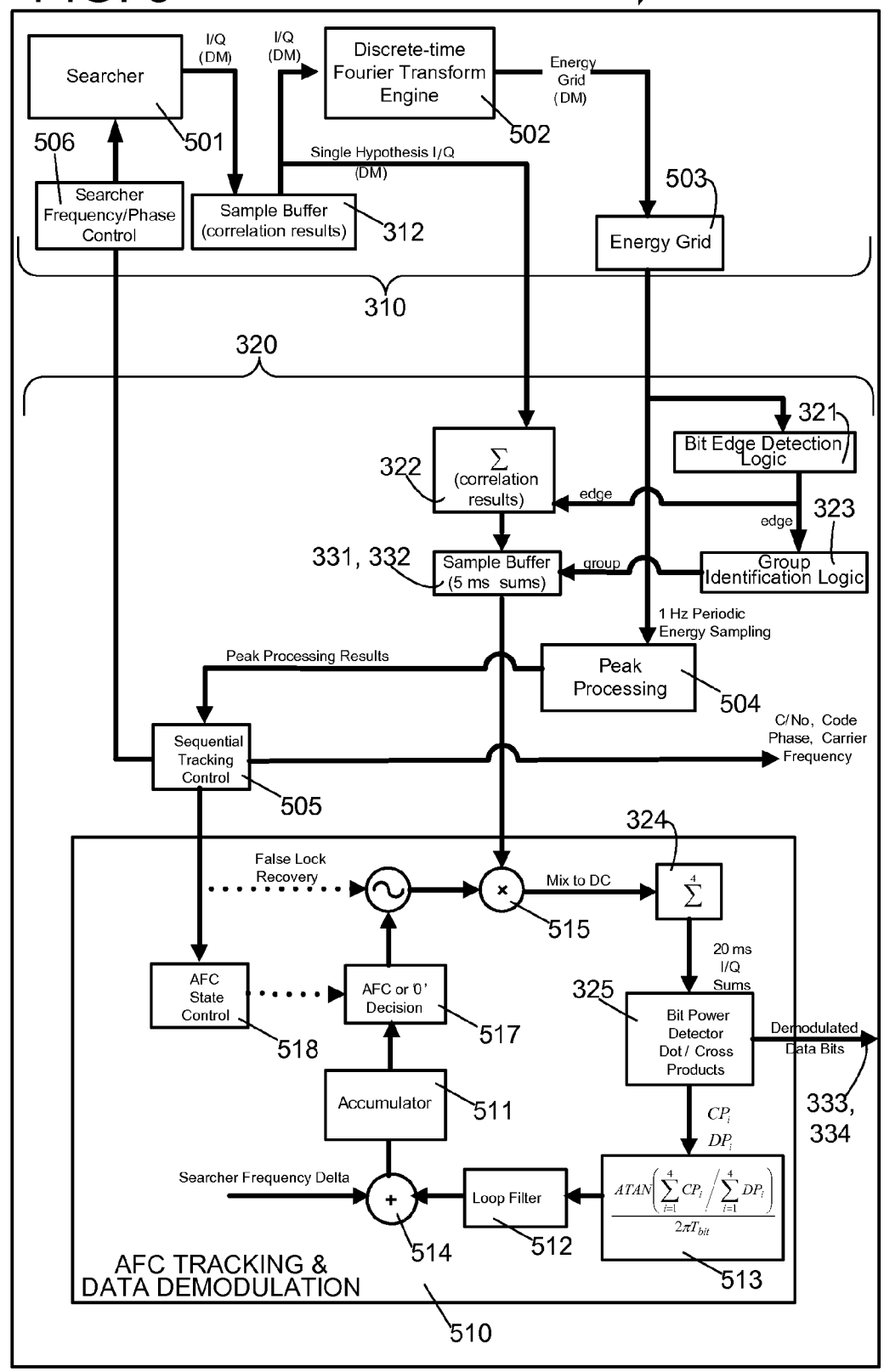
FIG. 5 illustrates, in a detailed block diagram, a wireless receiver that performs demodulation of data collected prior to bit edge detection, in some aspects of the invention.

As shown in FIG. 5, wireless hardware 310 in some aspects of the invention includes a searcher 501 that generates paired correlation results (over 1 millisecond), each pair including an in-phase sample I and a quadrature-phase sample Q. These 1 millisecond results are temporarily stored in a buffer 312 that is coupled (directly or indirectly connected) to summer 322 (both described above). In FIG. 5, buffer 312 is also coupled to a discrete-time fourier transform (DFT) engine 502 that in turn is coupled to an energy grid 503. Energy grid 503 in turn is coupled to bit edge detection logic 313 and to peak processing module 504. The results from peak processing module 504 are supplied to a sequential tracking control module 505 that in turn is coupled to a searcher frequency/phase control circuit 506. Circuit 506 controls operation of searcher 501.

In FIG. 5, a buffer holds sums 331, 332 that are supplied to a mixer 515 that provides the results to summer 324. Summer 324 generates 20 millisecond I/Q sums that are provided to bit decision logic 325 that generates the demodulated data bits 333, 334. Note that mixer 515, summer 324, and logic 325 are included in an AFC tracking and data demodulation unit 510 in wireless receiver 300. Unit 510 includes additional components, such as ATAN module 513, loop filter 512, summer 514, accumulator 511, AFC or 0 Decision logic 517, AFC state control 518 etc.

In some aspects of the invention, several items shown in FIG. 5 which are identified with a reference number greater than 500, are similar or identical to corresponding items described in United States Patent Application 20090215419 by Farmer et al. published Aug. 27, 2009 and entitled "SEQUENTIAL TRACKING AND OFFLINE DEMODULATION IN RECEIVER". Specifically, for detailed information on searcher 501, DFT engine 502, energy grid 503, peak processing module 504, sequential tracking control module 505, searcher frequency/phase control circuit 506, and AFC tracking and data demodulation unit 510, see United States Patent Application 20090215419, incorporated by reference herein in its entirety.

In some aspects of the invention, wireless receiver 300 forms early-collected groups by additionally discarding from each group (and hence from every data bit decision), an integration sum ("straddling sum") that straddles a location (in time) of a bit edge, e.g. group 421 (FIG. 4A) is formed to include only sums C1, D1 and A2 (thereby discarding B1), and similarly group 422 is formed to include only sums C2, D2 and A3 (thereby discarding B2). Therefore, no integration sum in such groups straddles the edge of the data bit. Such a grouping (to exclude straddling sums) is unnecessary in situations where there is no transition in the value of the data bit.

Discarding a straddling sum may result in a performance degradation, e.g. when there is a transition, resulting in a loss of energy, for example 2.5 dB (when using 5 ms sums for a 20 ms data bit). Specifically, early-collected sums when not aligned to the data bit edge in FIG. 4A, cause a corresponding performance degradation when the grouping excludes straddling sums. However, such a degradation is sufficiently small to not be an issue, in certain aspects of the invention wherein signal 10 is strong. Hence, in such aspects of the invention, an AFC loop is operated without the integration sums that straddle the bit edge (e.g. without sums B1 and B2 which are discarded, as described in the previous paragraph).

Note that the performance degradation described in the previous paragraph is not an issue in certain aspects of the invention that use all four sums B1, C1, D1 and A2 in group 421, and similarly use all four sums B2, C2, D2 and A3 in group 422, when there is no actual transition in the value of the data bit, between these two groups. Accordingly, all four sums are used to form each group (and hence used in every data bit decision) in several aspects of the invention.

Depending on the aspect of the invention, various acts described herein can be performed in different orders relative to one another. For example, in some aspects of the invention, acts 446 and 447 (FIG. 4C) are performed after act 445 as per branch 449, while in other aspects of the invention acts 444 and 445 are performed after act 446 as per branch 448.

The detailed description set forth above in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

The method and apparatus described herein in reference to FIGS. 2A, 2B, 3A-3C, 4A-4D and 5 are used with the United States Global Positioning System (GPS) in some aspects of the invention. In several such aspects, time in GPS clock software is maintained by its estimated value and an uncertainty associated with that value. It may be noted that after an accurate GPS location fix, the GPS time will often be accurately known as described above (within a few tens of nanoseconds uncertainty in the current GPS implementations).

Moreover, in addition to GPS, the above-described method and apparatus illustrated in FIGS. 2A, 2B, 3A-3C, 4A-4D and 5 may be used with various other satellite positioning systems (SPS), such as the Russian Glonass system (wherein a data bit is 10 milliseconds in duration rather than 20 ms described above for GPS), the European Galileo system, any system that uses satellites from a combination of satellite systems, or any satellite system developed in the future. Accordingly, although a bit edge detection logic 313 is used in some aspects of the invention to determine the edge of a bit at which a transition may occur in signal 10 in case of two adjacent bits of different values, other aspects of the invention include bit center detection logic to detect a transition at the center of a data bit (e.g. in GLONASS), in order to determine the phase difference between the local clock and the data in signal 10. Accordingly, a bit edge detection logic 321 (FIG. 3C) and a bit center detection logic (not shown) are two examples of a bit boundary determination logic, that is implemented appropriately (depending on the satellite signal) to determine the location of the data bit relative to a local clock. Accordingly, although a GPS environment is described in some aspects of the invention, the system and method described herein may be implemented in any positioning system.

Furthermore, the disclosed method and apparatus may be used with positioning determination systems that utilize wireless signals from pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used in describing this invention, is intended to include pseudolites, equivalents of pseudolites, and possibly others. The term "SPS signals", as used herein, is intended to include SPS-like signals from pseudolites or equivalents of pseudolites.

Depending on the aspect of the invention, a wireless receiver 300 of the type described above may be included in any mobile station (MS), of the type described below. As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile device which is capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." Personal Information Managers (PIMs) and Personal Digital Assistants (PDAs) which are capable of receiving wireless communications.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory 330 (FIG. 3A), for example the memory of a mobile station, and executed by a processor 320, for example a microprocessor. Memory 330 (FIG. 3A) may be implemented within a single chip that includes processor 320 or external to the chip that contains processor 320. As used herein the term "memory" refers to any type of long term, short term, volatile (e.g. DRAM), nonvolatile (e.g. SRAM), or other memory accessible by a processor 320 of a wireless receiver 300 and is not to be limited to any particular type of memory or number of memories, or type of media upon which memory is stored.

Moreover, position determination techniques used by navigation logic 326 (FIG. 3A) may be used for various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit (or processor) having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several non-transitory storage media types including, for example, magnetic, optical or semiconductor storage media. Such storage devices may also comprise any type of long term, short term, volatile or non-volatile devices memory devices. However, these are merely examples of a computer-readable storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "reducing," "associating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine (or computer) readable instructions stored in a storage medium, for example. Such machine (or computer) readable instructions may comprise, for example, software or firmware stored in a storage medium included as part of a computing platform (e.g., included as part of a processing circuit or external to such a processing circuit). Further, unless specifically stated otherwise, a process described herein, with reference to flow diagrams or otherwise, may also be executed and/or controlled, in whole or in part, by such a computing platform.

Numerous modifications and adaptations of the various aspects described herein are encompassed by the attached claims.

The invention claimed is:

1. A method of extracting data bits from a wireless signal, the method comprising:
    retrieving a plurality of results of correlating a baseband version of the wireless signal with a locally-generated reference signal;
    repeating over a time period:
    integrating the plurality of results of correlating, independent of a location of an edge of a data bit in the wireless signal relative to a local clock, to produce a plurality of sums; and
    storing the plurality of sums obtained by said integrating;
    using at least the plurality of results of correlating, to determine the location of the edge of the data bit relative to the local clock;
    demodulating the plurality of sums stored by said storing, based on the location of the edge of the data bit, to generate at least the data bit;
    storing said at least the data bit obtained by said demodulating; and
    wherein at least the demodulating is performed by a processor and the generated data bit is stored in a memory coupled to the processor, and wherein in performing the demodulating the processor uses the location of the edge of the data bit to identify from within the plurality of sums stored by said storing, a group of sums corresponding to a duration of the data bit in the wireless signal and integrates the sums in the group of sums to generate an additional data bit.

2. The method of claim 1 wherein:
the group of sums is identified by the processor such that only one integration sum in the group of sums straddles the edge of the data bit.

3. The method of claim 1 wherein:
the group of sums is identified by the processor such that no integration sum in the group of sums straddles the edge of the data bit.

4. A method of extracting data bits from a wireless signal, the method comprising:
retrieving a plurality of results of correlating a baseband version of the wireless signal with a locally-generated reference signal;
repeating over a time period:
integrating the plurality of results of correlating, independent of a location of an edge of a data bit in the wireless signal relative to a local clock, to produce a plurality of sums; and
storing the plurality of sums obtained by said integrating;
using at least the plurality of results of correlating, to determine the location of the edge of the data bit relative to the local clock;
demodulating the plurality of sums stored by said storing, based on the location of the edge of the data bit, to generate at least the data bit;
storing said at least the data bit obtained by said demodulating;
wherein at least the demodulating is performed by a processor and the generated data bit is stored in a memory coupled to the processor;
forming a plurality of additional correlation results aligned to the location of the data bit; and
integrating the additional correlation results to generate a plurality of additional data bits.

5. A method of extracting data bits from a wireless signal, the method comprising:
retrieving a plurality of results of correlating a baseband version of the wireless signal with a locally-generated reference signal;
repeating over a time period:
integrating the plurality of results of correlating, independent of a location of an edge of a data bit in the wireless signal relative to a local clock, to produce a plurality of sums; and
storing the plurality of sums obtained by said integrating;
using at least the plurality of results of correlating, to determine the location of the edge of the data bit relative to the local clock;
demodulating the plurality of sums stored by said storing, based on the location of the edge of the data bit, to generate at least the data bit;
storing said at least the data bit obtained by said demodulating;
wherein at least the demodulating is performed by a processor and the generated data bit is stored in a memory coupled to the processor, and the plurality of sums stored by said storing, are demodulated during integration of additional integration sums.

6. An article comprising:
a non-transitory computer-readable storage medium having stored therein instructions executable by a processor to:
retrieve a plurality of results of correlating a baseband version of the wireless signal with a locally-generated reference signal;
repeatedly perform over a time period:
integration of the plurality of results of correlating, independent of a location of an edge of a data bit in the wireless signal relative to a local clock, to produce integration sums; and
store the integration sums;
determine the location of the edge of the data bit relative to the local clock based, at least in part, on at least the plurality of results of correlating;
demodulate the stored plurality of sums to generate at least the data bit based, at least in part, on using the location of the edge of the data bit to identify from among the plurality of integration sums, a group of integration sums corresponding to a duration of the data bit in the wireless signal; sum up the integration sums, in the group of integration sums; and
store the data bit.

7. The article of claim 6 the instructions being further executable by the processor to:
identify the group of integration sums such that only one integration sum in the group straddles the edge of the data bit.

8. The article of claim 6 the instructions being further executable by the processor to:
identify the group of integration sums such that no integration sum in the group straddles the edge of the data bit.

9. An article comprising:
a non-transitory computer-readable storage medium having stored therein instructions executable by a processor to:
retrieve a plurality of results of correlating a baseband version of the wireless signal with a locally-generated reference signal;
repeatedly perform over a time period:
integration of the plurality of results of correlating, independent of a location of an edge of a data bit in the wireless signal relative to a local clock, to produce integration sums; and
store the integration sums;
determine the location of the edge of the data bit relative to the local clock based, at least in part, on at least the plurality of results of correlating;
demodulate the stored plurality of sums to generate at least the data bit based, at least in part, on the location of the edge of the data bit;
store the data bit;
form a plurality of additional correlation results aligned to the location of the edge of the data bit; and
sum the additional correlation results to generate a plurality of additional data bits.

10. An article comprising:
a non-transitory computer-readable storage medium having stored therein instructions executable by a processor to:
retrieve a plurality of results of correlating a baseband version of the wireless signal with a locally-generated reference signal;
repeatedly perform over a time period:
integration of the plurality of results of correlating, independent of a location of an edge of a data bit in the wireless signal relative to a local clock, to produce integration sums; and
store the integration sums;

concurrently with at least said integration, determine the location of the edge of the data bit relative to the local clock based, at least in part, on at least the plurality of results of correlating;
demodulate the stored plurality of sums to generate at least the data bit based, at least in part, on the location of the edge of the data bit; and
store the data bit.

11. An apparatus for extracting data bits from a wireless signal, the apparatus comprising:
means for storing a plurality of results of correlating a baseband version of the wireless signal with a locally-generated reference signal;
means for integrating the plurality of results of correlating, independent of a location of an edge of a data bit in the wireless signal relative to a local clock, to produce sums;
means for storing the sums;
means for using at least the plurality of results of correlating, to determine the location of the edge of the data bit relative to the local clock;
means for demodulating the plurality of sums stored by said means for storing, based on the location of the edge of the data bit, to generate at least the data bit;
means for storing in a memory, the data bit obtained from said means for demodulating;
means for using the location of the data bit to identify from within the plurality of sums stored by said means for storing, a group of sums corresponding to a duration of the data bit in the wireless signal; and
means for integrating the sums, in the group of sums.

12. The apparatus of claim 11 and further comprising:
means for identifying the group of sums such that only one sum therein straddles the edge of the data bit.

13. An apparatus for extracting data bits from a wireless signal, the apparatus comprising:
means for storing a plurality of results of correlating a baseband version of the wireless signal with a locally-generated reference signal;
means for integrating the plurality of results of correlating, independent of a location of an edge of a data bit in the wireless signal relative to a local clock, to produce sums;
means for storing the sums;
means for using at least the plurality of results of correlating, to determine the location of the edge of the data bit relative to the local clock;
means for demodulating the plurality of sums stored by said means for storing, based on the location of the edge of the data bit, to generate at least the data bit;
means for storing in a memory, the data bit obtained from said means for demodulating; and
means for identifying the group of sums such that no sum therein straddles the edge of the data bit.

14. An apparatus for extracting data bits from a wireless signal, the apparatus comprising:
means for storing a plurality of results of correlating a baseband version of the wireless signal with a locally-generated reference signal;
means for integrating the plurality of results of correlating, independent of a location of an edge of a data bit in the wireless signal relative to a local clock, to produce sums;
means for storing the sums;
means for using at least the plurality of results of correlating, to determine the location of the edge of the data bit relative to the local clock;
means for demodulating the plurality of sums stored by said means for storing, based on the location of the edge of the data bit, to generate at least the data bit;
means for storing in a memory, the data bit obtained from said means for demodulating; and
means for using additional correlation results aligned to the location of the data bit.

15. An apparatus for extracting data bits from a wireless signal, the apparatus comprising:
means for storing a plurality of results of correlating a baseband version of the wireless signal with a locally-generated reference signal;
means for integrating the plurality of results of correlating, independent of a location of an edge of a data bit in the wireless signal relative to a local clock, to produce sums;
means for storing the sums;
means for using at least the plurality of results of correlating, to determine the location of the edge of the data bit relative to the local clock;
means for demodulating the plurality of sums stored by said means for storing, based on the location of the edge of the data bit, to generate at least the data bit;
means for storing in a memory, the data bit obtained from said means for demodulating; and
wherein the means for demodulating is configured to operate during receipt of additional sums, to simultaneously demodulate the plurality of sums stored by said means for storing.

16. A wireless receiver to extract data bits from a wireless signal, the wireless receiver comprising:
a buffer comprising a plurality of results of correlating a baseband version of the wireless signal received at an antenna with a locally-generated reference signal;
a data bit location determination logic coupled to the buffer to receive therefrom, the plurality of results of correlating;
a summer coupled to the buffer to receive therefrom, the plurality of results of correlating, the summer being further coupled to the data bit location determination logic to receive therefrom a location of an edge of a data bit in the wireless signal relative to a local clock;
a group identification logic coupled to the data bit location determination logic to receive the location of the edge of the data bit; and
a memory coupled to the summer to receive therefrom a plurality of sums, the memory being further coupled to the group identification logic to receive therefrom a plurality of pointers identifying a group of the sums corresponding to a bit of data in the wireless signal.

17. The wireless receiver of claim 16 wherein:
the group identification logic is configured to identify the group of the sums such that only one sum therein straddles the edge of the data bit.

18. The wireless receiver of claim 16 wherein:
the group identification logic is configured to identify the group of the sums such that no sum therein straddles the edge of the data bit.

19. The wireless receiver of claim 16 further comprising:
an additional summer coupled to the memory to receive therefrom the group of sums and add up the sums, in the group of the sums; and
a bit decision logic coupled to the additional summer to receive therefrom a result of adding up the sums, in the group of the sums;
wherein the memory is coupled to the bit decision logic to receive therefrom a value of the data bit in the wireless signal.

* * * * *